J. KILDEAR.
COUPLING DEVICE FOR CAN LIDS, PIPES, SHAFTS, AND SIMILAR OBJECTS.
APPLICATION FILED SEPT. 16, 1912.
1,164,197. Patented Dec. 14, 1915.
2 SHEETS—SHEET 1.
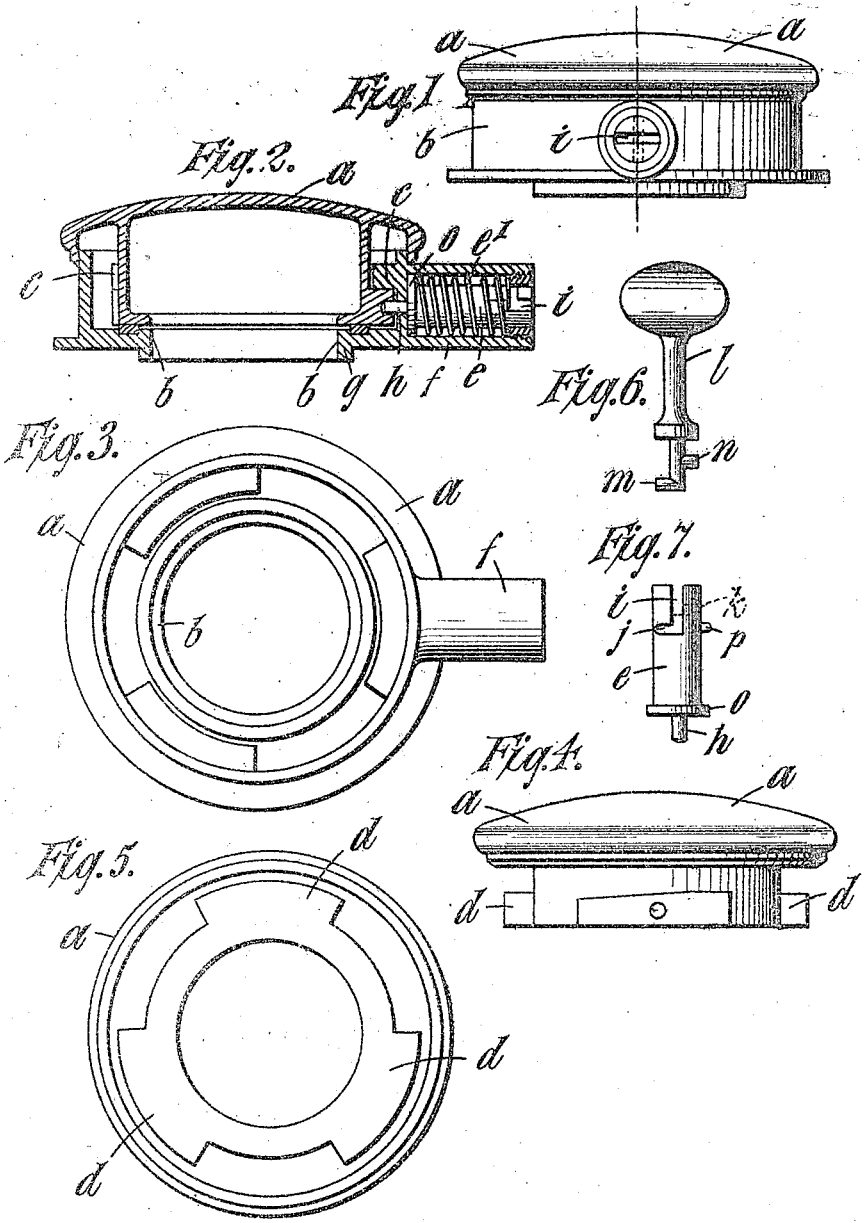

J. KILDEAR.
COUPLING DEVICE FOR CAN LIDS, PIPES, SHAFTS, AND SIMILAR OBJECTS.
APPLICATION FILED SEPT. 16, 1912.
1,164,197.
Patented Dec. 14, 1915.
2 SHEETS—SHEET 2.
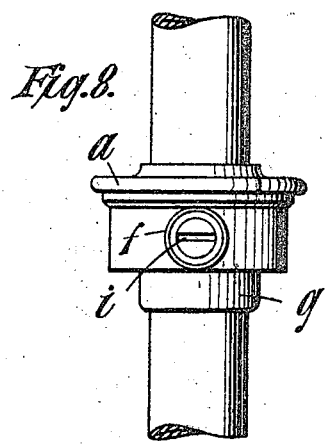
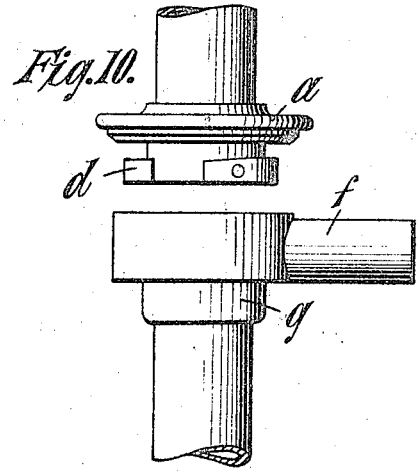
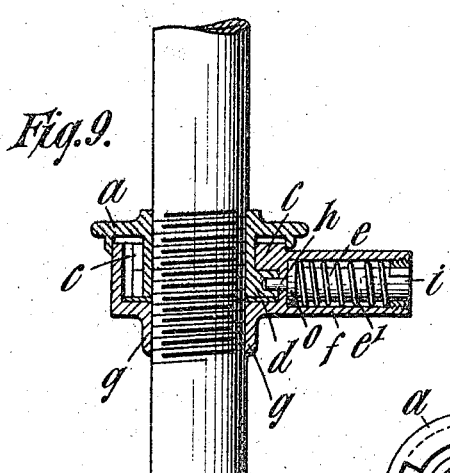
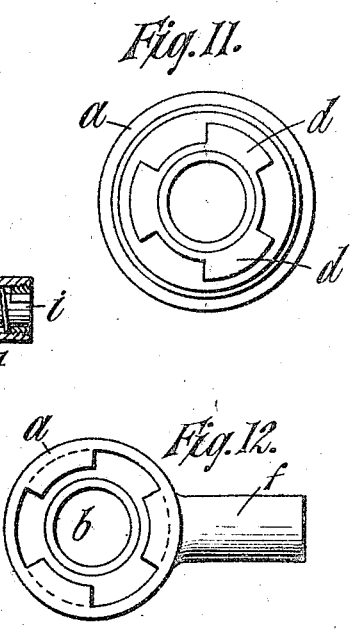
John Kildear
Inventor

UNITED STATES PATENT OFFICE.

JOHN KILDEAR, OF LONDON, ENGLAND.

COUPLING DEVICE FOR CAN-LIDS, PIPES, SHAFTS, AND SIMILAR OBJECTS.

1,164,197.  Specification of Letters Patent.  Patented Dec. 14, 1915.

Application filed September 16, 1912. Serial No. 720,692.

*To all whom it may concern:*

Be it known that I, JOHN KILDEAR, a subject of the King of Great Britain, residing at 69 Wavertree road, Streatham Hill, London, England, have invented certain new and useful Improvements in Coupling Devices for Can-Lids, Pipes, Shafts, and Similar Objects, of which the following is a specification.

This invention relates to that kind of coupling device suitable for can-lids, pipes, shafts and other similar objects, in which the movable part or half of the coupling is attached to the stationary or fixed part or half by producing first an axial and then rotary motion of the movable part, as is the case for instance in bayonet locks, and in connection with which a locking device in the form of a spring operated pin or bolt is mounted in one of the parts of the coupling and is adapted to be protruded by the spring into a position for engaging with a hole or recess in the other part of the coupling.

The present invention consists in the improved means for withdrawing or retracting the bolt as and when required and to this end the spring operated pin or bolt is of a hollow constructional form and is adapted to receive or be engaged by a key of special form for this purpose.

In order to enable the invention to be readily understood reference is made to the accompanying drawings, in which:—

Figure 1 is a side elevation of the cap and neck of a petrol can or the like having the present improvements applied thereto. Fig. 2 is a central vertical section of Fig. 1 taken on a plane perpendicular to the plane of the paper. Fig. 3 is a plan of Fig. 2 with the cap removed. Fig. 4 is a side elevation of the cap. Fig. 5 is an underside plan of the cap. Fig. 6 is a side elevation of a suitable key for unfastening the locking device. Fig. 7 is a side elevation of the locking pin removed. Fig. 8 is a side elevation of the present improvements applied to a pipe coupling. Fig. 9 is a central vertical section of Fig. 8 but showing the pipe in elevation, the plane of the section being at right angles to the plane of the paper. Fig. 10 is a side elevation of Fig. 9 showing the parts of the coupling separated. Fig. 11 is an inverted plan of the upper half of the coupling and Fig. 12 is a plan of the lower half of the coupling.

Referring to the Figs. 1 to 7 of the drawings, the locking device is shown applied to a coupling employed for connecting a cap $a$ to, for example, the neck $b$ of a petrol can or the like. The interlocking projections are indicated by the reference letters $c$ $d$ and the act of coupling and uncoupling will be readily understood. The locking pin $e$ operated upon by a spring $e'$ is shown mounted perpendicularly to the axis of the parts coupled and the spring bolt casing $f$ which is interiorly threaded at its open end is mounted on or formed in one with a flange $g$ on the neck part $b$. The end of the locking pin $e$ is shown considerably reduced at $h$ forming a stud which is adapted to enter sockets drilled in the peripheral edges of the projections or lugs $d$. The casing $f$ may be used in operation as a handle for turning the cap or coupling part. The outer end of the pin or bolt $e$ is formed with an axial slot or saw cut $i$ from which branch at different distances from the extremity transverse slots or saw cuts $j$ and $k$. A key $l$ Fig. 6 is formed with projections $m$ and $n$ corresponding in relative position and length with the slots $j$ and $k$ respectively. It will now be readily understood that a bolt constructed according to this invention can only be retracted after inserting the special key $l$ into the slot $i$ until the projections $m$ and $n$ come opposite the recesses $j$ and $k$ the key being then turned, thereby engaging the projections with the recesses, whereupon the key is pulled and retracts the bolt. The flange $o$ on the bolt whose periphery is in contact with the interior of the casing $f$ serves to guide one end of the bolt, the other end being guided through a ring $f'$ which is threaded into the open end of the casing, and in addition to guiding the bolt serves as an abutment for one end of the spring. The projections $d$ as seen in Fig. 4 may have inclined engaging surfaces arranged in known manner for the purpose of drawing the coupling parts together when turning them in the direction for coupling up. A guide pin $p$ may be formed on the locking bolt or adapted to engage with a guide groove or slot in the casing $f$.

Figs. 8 to 12 show a locking device very similar to that illustrated by Figs. 1 to 7 as applied to a coupling for a tube or pipe, but of course the coupling might be applied equally well to a shaft or rod. The parts being referred to by reference letters similar to those employed in connection with corresponding parts in the previous figures, the construction and operation of the coupling lock seen in Figs. 8 to 12 will be readily understood without further description.

What I claim and desire to secure by Letters Patent of the United States is:—

A locking device comprising in combination with a stationary cup-like member having a plurality of spaced lugs located above the bottom wall thereof, and a relatively rotatable universal cap member having a central tubular portion provided at its edge with a plurality of spaced apart lugs for engaging with the lugs of the stationary member to thereby prevent lateral separation of the members, the lugs of said cap member being provided with sockets, an offstanding casing carried by the stationary member and having in the closed end thereof a locking stud opening, and a spring pressed longitudinally movable locking bolt arranged within said casing and having a locking stud adapted to be projected through said opening to enter any one of the sockets of the cap lugs to lock the cap and stationary member against relative rotation.

In testimony whereof I affix my signature in presence of two witnesses.

JOHN KILDEAR.

Witnesses:
P. WOODWARD,
H. D. JAMESON.